(12) United States Patent
Park et al.

(10) Patent No.: US 7,566,492 B2
(45) Date of Patent: Jul. 28, 2009

(54) FOAMED STONE ARTICLE AND METHOD FOR PREPARING THE SAME

(75) Inventors: Eung Seo Park, Yeous-si (KR); Do Choon Rha, Seoul (KR); Jae Wook Juen, Seoul (KR)

(73) Assignee: Cheil Industries, Inc., Gum-shi, Gyeongsangbuk-do (KR)

( * ) Notice: Subject to any disclaimer, the term of this patent is extended or adjusted under 35 U.S.C. 154(b) by 0 days.

(21) Appl. No.: 11/812,139

(22) Filed: Jun. 15, 2007

(65) Prior Publication Data

US 2007/0243369 A1    Oct. 18, 2007

Related U.S. Application Data

(63) Continuation of application No. PCT/KR2005/004356, filed on Dec. 16, 2005.

(30) Foreign Application Priority Data

Dec. 17, 2004    (KR)    ............. 10-2004-0107878

(51) Int. Cl.
*B32B 5/30* (2006.01)
*B29C 41/36* (2006.01)
(52) U.S. Cl. ............. 428/318.8; 428/318.6; 428/319.3; 428/319.7; 524/425; 524/430; 524/432; 524/437; 524/878

(58) Field of Classification Search ............ 428/318.6, 428/319.3, 319.7, 318.8; 524/243, 522, 425, 524/430, 432, 437, 878
See application file for complete search history.

(56) References Cited

U.S. PATENT DOCUMENTS

| 5,043,377 A | * | 8/1991 | Nogi et al. ............... 524/437 |
| 5,186,703 A | * | 2/1993 | Huang ..................... 482/148 |

FOREIGN PATENT DOCUMENTS

| JP | 04-160044 | 6/1992 |
| JP | 2003-94446 | 4/2003 |
| KR | 356886 B1 | 1/2003 |
| KR | 2004-0054230 | 6/2004 |

OTHER PUBLICATIONS

English Abstract of KR 2004005044, Jan. 16, 2004, 2 pages.*
Translation of JP 2003-094446, Matsumura et al, "Artificial Marble," Apr. 3, 2003.*
Translation of KR 2004-0005044, Kim et al, "Artificial Marble having Marble Chips Not Settled Down", Jan. 16, 2004.*

* cited by examiner

*Primary Examiner*—Hai Vo
(74) *Attorney, Agent, or Firm*—Lee & Morse, P.C.

(57) ABSTRACT

A foamed stone article has a lower artificial stone layer and an upper foam layer that are a single body. A composition for the foamed stone article includes about 100 parts by weight of acrylic resin, about 10 to about 80 parts by weight of solid particles and about 0.1 to about 10 parts by weight of an initiator.

12 Claims, 2 Drawing Sheets

FOAMED STONE ARTICLE AND METHOD FOR PREPARING THE SAME

CROSS-REFERENCE TO RELATED APPLICATION

This application is a continuation of PCT Application No. PCT/KR2005/004356, entitled "FOAMED MARBLE ARTICLE AND METHOD FOR PREPARING THE SAME," which was filed on Dec. 16, 2005.

BACKGROUND OF THE INVENTION

1. Field of the Invention

The present embodiments relate to a foamed stone article and a method for preparing the same. More particularly, the present embodiments relate to a foamed stone article having light weight and good workability achieved by foaming acrylic resin during a curing process.

2. Description of the Related Art

Artificial stone may classified into two groups according to the base resin material, where one group represents acrylic artificial stone, and the other group represents unsaturated polyester artificial stone. The acrylic artificial stone has found wide utilization as a material for, e.g., kitchen countertops, wash basins, dressing tables, bathtubs, various table surfaces, wall materials, interior articles, etc., because it has excellent appearance, high-gloss texture, and good weatherability, when compared with the unsaturated polyester artificial stone.

Acrylic artificial stone may be prepared by injection molding a resin mixture, and then curing the injection molded resin mixture. The resin mixture may be prepared by adding, e.g., inorganic fillers, pigments, curing agents, and other additives such as polymerization initiators, releasing agents, dispersal agents, etc., to a liquid resin of, e.g., methyl methacrylate (MMA), polymethyl methacrylate (PMMA), etc.

Commercial artificial stones may typically have a thickness of about 13 mm. Although artificial stone may be superior to natural stone due to its light weight and workability, artificial stone may still be heavier and more expensive than plywood, so a combined panel in which a thin, e.g., about 3 mm thick, plywood panel may be attached to the surface of an artificial stone panel may find commercial applications.

However, this plywood-composite artificial stone may require high labor costs and may have poor durability, and the range of applications may be limited due to a bonding agent applied thereto.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present embodiments are therefore directed to a composition for a foamed stone article, a foamed stone article, and a method for manufacturing a foamed stone article, which substantially overcome one or more of the problems due to the limitations and disadvantages of the related art.

It is therefore a feature of an embodiment of the present invention to provide a lightweight foamed stone article.

It is therefore another feature of an embodiment of the present invention to provide a foamed stone article having high workability.

It is therefore another feature of an embodiment of the present invention to provide a method of preparing a foamed stone article.

At least one of the above and other features and advantages of the present embodiments may be realized by providing a composition for foamed artificial stone, which may include a first acrylic resin, about 10 to about 80 parts by weight of solid particles, based on 100 parts by weight of the first acrylic resin, and about 0.1 to about 10 parts by weight of a first initiator, based on 100 parts by weight of the first acrylic resin.

The solid particles may be at least one of a first inorganic filler, stone chips, or a mixture thereof. The solid particles may include the first inorganic filler, and the first inorganic filler may be calcium carbonate, aluminum hydroxide, silica, alumina, magnesium hydroxide, zinc oxide, or a mixture thereof. The stone chips may be a cured and pulverized mixture of a second acrylic resin, about 100 to about 200 parts by weight of a second inorganic filler, based on 100 parts by weight of the second acrylic resin, about 0.1 to about 10 parts by weight of a cross-linking agent, based on 100 parts by weight of the second acrylic resin, and about 0.1 to about 10 parts by weight of a second initiator, based on 100 parts by weight of the second acrylic resin. The composition may have a fluidity ranging from about 13 cm/min to about 20 cm/min. The acrylic resin may be a mixture of acrylic monomer and polyacrylate. The acrylic monomer may include at least one of acrylic acid, methyl acrylate, ethyl acrylate, butyl acrylate, methyl methacrylate, ethyl methacrylate, isopropyl methacrylate, butyl methacrylate, or 2-ethylhexyl methacrylate.

At least one of the above and other features and advantages of the present embodiments may be realized by providing a method for preparing a foamed stone article, which may include mixing an acrylic resin, solid particles, and an initiator to form a foamable mixture, resting the foamable mixture for a period of time sufficient to allow the acrylic resin to migrate to an upper part to form an upper layer while the solid particles migrate to a lower part to form a lower layer, and curing the foamable mixture while foaming the acrylic resin of upper layer.

Exothermic polymerization during the curing may produce the foaming. The solid particles may be at least one of inorganic filler, stone chips, or a mixture thereof. The composition may have a fluidity ranging from about 13 cm/min to about 20 cm/min. The acrylic resin may be a mixture of acrylic monomer and polyacrylate. The foamable mixture may be poured onto a surface of a solid artificial stone plate before resting the foamable mixture for the period of time sufficient to allow the acrylic resin to migrate to the upper part.

At least one of the above and other features and advantages of the present embodiments may be realized by providing a foamed stone article, which may include a layer of artificial stone, and a foam layer, where the foam layer and the layer of artificial stone are a single body.

The foam layer may include a cured first acrylic resin, about 10 to about 80 parts by weight of solid particles, based on 100 parts by weight of the first acrylic resin, and about 0.1 to about 10 parts by weight of a first initiator, based on 100 parts by weight of the first acrylic resin. The cured first acrylic resin may include at least one of acrylic acid, methyl acrylate, ethyl acrylate, butyl acrylate, methyl methacrylate, ethyl methacrylate, isopropyl methacrylate, butyl methacrylate, or 2-ethylhexyl methacrylate. The solid particles may be at least one of a first inorganic filler, stone chips, or a mixture thereof. The solid particles may include the first inorganic filler, and the inorganic filler may be at least one of calcium carbonate, aluminum hydroxide, silica, alumina, magnesium hydroxide, zinc oxide or a mixture thereof. The stone chips may be a cured and pulverized mixture of a second acrylic resin, about 100 to about 200 parts by weight of a second inorganic filler, based on about 100 parts by weight of the second acrylic resin, about 0.1 to about 10 parts by weight of a cross-linking agent, based on about 100 parts by weight of the second acrylic resin, and about 0.1 to about 10 parts by weight of a second initiator based on about 100 parts by weight of the second acrylic resin. The foam layer may have irregular pores.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
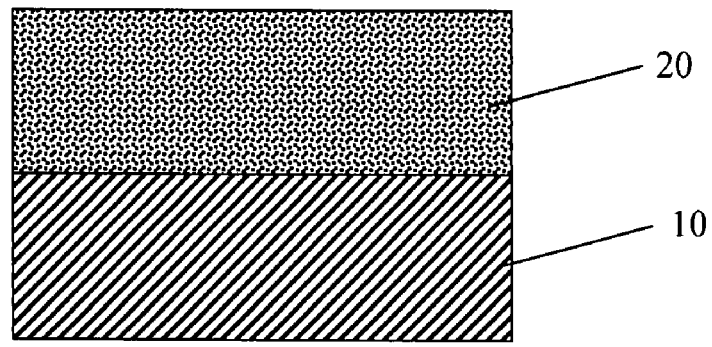
FIG. 1 illustrates a cross sectional view of a foamed artificial stone article.

Korean Patent Application No. 10-2004-0107878, filed on Dec. 17, 2004, in the Korean Intellectual Property Office, and entitled: "Foamed Marble Article and Method for Preparing the Same," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Embodiments of the present invention provide a light weight foamed stone article having high workability by manufacturing a specific foamable composition for artificial stone, inducing an acrylic resin in the foamable composition, which may migrate to an upper part to form an upper layer, and curing the foamable composition while foaming the acrylic resin of the upper layer. Foaming may be achieved using, e.g., an intrinsically exothermic reaction of the acrylic resin.

FIG. 1 illustrates a cross sectional view of a foamed artificial stone article.

Referring to FIG. 1, the foamed stone article may include a lower layer 10 of an acrylic artificial stone and an upper layer 20 of foam of an acrylic resin having irregular pores. The upper layer 20 and the lower layer 10 may be a single body.

The upper layer 20 and the lower layer 10 may be prepared from a foamable composition for artificial stone.

The foamable composition for foamed artificial stone may include an acrylic resin, solid particles, and an initiator. "Acrylic resin," as defined herein, may be one or a mixture of acrylic and/or methacrylic monomers and its polymer, polyacrylate. In one embodiment, the acrylic resin comprises one or more acrylic monomers and optionally one or more polyacrylates. The acrylic or methacrylic monomers may include, e.g., acrylic acid, methyl acrylate, ethyl acrylate, butyl acrylate, methyl methacrylate, ethyl methacrylate, isopropyl methacrylate, butyl methacrylate, 2-ethylhexyl methacrylate, etc. "Polyacrylate," as defined herein, may be a polymer or copolymer of at least one of the above monomers. Among them, PMMA may be preferred.

The amount of the acrylic monomer in the acrylic resin may be, e.g., about 80% to about 95% by weight, and of the amount of the polyacrylate in the acrylic resin may be, e.g., about 5% to about 20% by weight, thereby sufficient foaming may be obtained. A blowing agent may be additionally or optionally be employed to enhance the foaming. In implementation, foaming may be achieved using only the exothermic reaction of the acrylic resin, and no blowing agent may be used.

The amount of the solid particles may be from about 10 parts by weight to about 80 parts by weight, based on 100 parts by weight of acrylic resin. In order to control the process easily and expand the acrylic monomer in acrylic resin sufficiently, it is preferable to use the solid particles in an amount of about 10 parts by weight to about 80 parts by weight.

The solid particles may include, e.g., inorganic fillers, marble chips, other stone chips, and mixtures thereof.

Suitable inorganic fillers may include, e.g., calcium carbonate, aluminum hydroxide, silica, alumina, magnesium hydroxide, zinc oxide, etc. Aluminum hydroxide may produce an elegant appearance of the resulting artificial stone.

The stone chips may be genuine stone, e.g. marble chips, or artificial, and may be of various colors. The artificial stone chips may be prepared by mixing, e.g., acrylic resin, about 100 to about 200 parts by weight of an inorganic filler, based on about 100 parts of the acrylic resin, about 0.1 to about 10 parts by weight of a cross linking agent, based on about 100 parts of the acrylic resin, and about 0.1 to about 10 parts by weight of an initiator, based on about 100 parts of the acrylic resin, curing the mixture, and pulverizing the cured material. An appropriate amount of cross-linking agent may be employed. The acrylic resin used for the artificial stone chips may include at least one of, e.g., acrylic acid, methyl acrylate, ethyl acrylate, butyl acrylate, methyl methacrylate, ethyl methacrylate, isopropyl methacrylate, butyl methacrylate, or 2-ethylhexyl methacrylate. Unsaturated polyester resin based stone chips may also be employed.

The initiator may include peroxides, e.g., benzoyl peroxide, lauroyl peroxide, butyl hydroperoxide, cumene hydroperoxide, etc., or azo compounds, e.g., azobisisobutyronitrile (AIBN), etc. The content of the initiator may range from about 0.1 to about 10 parts by weight, preferably from about 0.5 to about 5 parts by weight, per 100 parts by weight of acrylic resin. In order to provide sufficient foaming, an excess amount of initiator may be employed.

The foamable composition for artificial stone may have a fluidity (defined below) ranging from about 13 cm/min to about 20 cm/min.

The foamed stone article of the present invention may be prepared by the following method.

An acrylic resin, solid particles and an initiator may be mixed to form a foamable composition. The amount of the solid particles may be from about 10 parts by weight to about 80 parts by weight, based on about 100 parts of the acrylic resin, and the amount of the initiator may be from about 0.1 by weight to about 10 parts by weight, based on about 100 parts of the acrylic resin. The solid particles may be selected from, e.g., inorganic fillers, stone chips, mixtures thereof, etc.

The foamable composition for artificial stone may have a fluidity ranging from about 13 cm/min to about 20 cm/min, thereby the process may be easy to control and foaming may occur sufficiently.

The viscosity of the foamable composition for artificial stone may not be measured using a conventional viscometer because of the inorganic filler and the stone chips in the composition. Instead, the fluidity at about 36° C. may be measured. "Fluidity," as used herein, refers to a value obtained by dropping 30 g of a slurry onto a glass plate, allowing the slurry to flow for 1 minute, and measuring the diameter of the slurry. The unit of fluidity is "length/time." "Centimeter/minute (cm/min)" will be used as the unit of fluidity unless otherwise indicated. Although the "fluidity" used in this description may not be the reciprocal of conventional "viscosity," a high fluidity indicates a low viscosity. In other words, the higher the fluidity of the slurry, the lower the viscosity of the slurry.

When acrylic resin is polymerized, it may tend to seethe or bubble similar to boiling phenomena, generating gas due to an exothermic polymerization reaction. When this acrylic resin is cured, a rigid foam structure may be obtained The foamable composition may be rested for a period of time sufficient to allow the acrylic resin with a relatively low specific gravity to migrate upwards, while the solid particles with a relatively high specific gravity migrate downwards, so that two layers in which the acrylic resin layer is in the upper layer 20, may be formed. During the polymerization and curing process of the foamable composition, the acrylic resin of upper layer 20 may tend to be self-foaming via the exothermic polymerization reaction, so that gas is released to generate a foam structure in the upper layer 20. The solid particles and residual amount of the acrylic resin in lower layer 10 may be cured to form a layer of acrylic artificial stone. The foamed upper layer 20 may have a foam structure with irregular pores.

Figure 2:
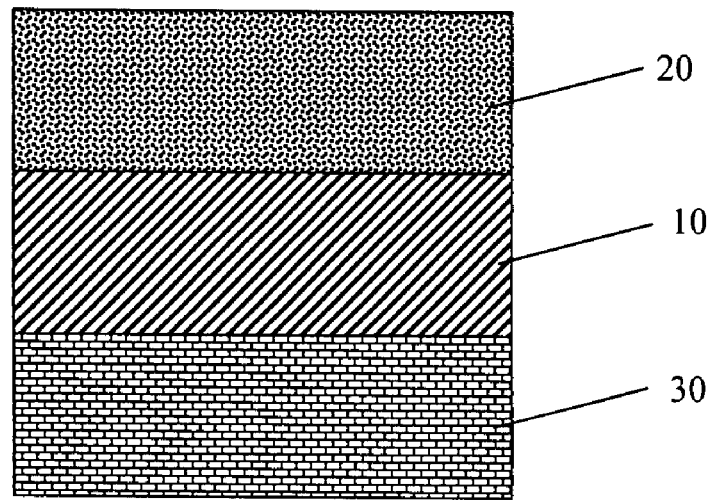
FIG. 2 illustrates a cross section view of a foamed artificial stone article on a solid artificial stone plate.

As illustrated in FIG. 2, the foamable composition may also be poured onto a surface of a solid artificial stone plate 30, left for sufficient time to allow the acrylic resin to migrate to the upper part, and then cured. The final foamed stone article may then have the foamed layer as its upper layer 20 and the solid artificial stone plate 30 under the lower layer 10. An artificial stone article of a desired pattern having a foamed layer in single body may thus be obtained. In this embodiment, adding stone chips to the composition may be optional because they may not be exposed, i.e., may be covered by the plate 30.

Other additives may be included in the foamable composition for artificial stone of the present invention. The additives may include one or more of, e.g., pigment, dye, light stabilizer, heat stabilizer, antistatic agent, impact modifier, plasticizer, etc.

The foamed stone article may be superior to a conventional artificial stone of the same size because of its light weight and workability, and may be utilized in various applications.

The invention may be better understood by reference to the following examples which are intended for the purpose of illustration and are not to be construed as in any way as limiting the scope of claimed embodiments. In the following examples, all parts and percentage are by weight unless otherwise indicated.

EXAMPLES

Example 1

Figure 3:
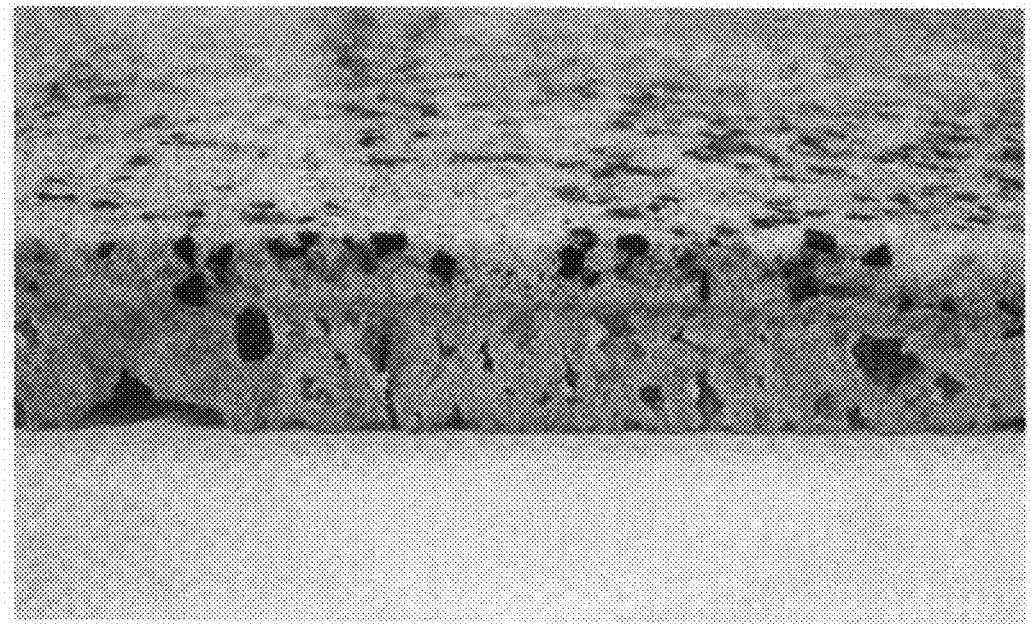
FIG. 3 is a photograph of a side view of a foamed artificial stone article obtained in Example 1.

A liquid acrylic resin was prepared containing 10 parts by weight of PMMA and 90 parts by weight of MMA. Blended with the liquid acrylic resin were 10 parts by weight of aluminum hydroxide, based on 100 parts by weight of the liquid acrylic resin, 10 parts by weight of stone chips, based on 100 parts by weight of the liquid acrylic resin, and 2 parts by weight of benzoyl peroxide, based on 100 parts by weight of the liquid acrylic resin, and the components were mixed to obtain a slurry. The fluidity of the slurry was 13.8 cm/min. The slurry was poured into a molding cell, and the slurry was rested to allow the acrylic resin to migrate to the upper part and the stone chips to migrate to the lower part. The slurry was allowed to cure slowly. The resulting cured foamed artificial stone had a foamed upper layer. A photograph of the side view of the cured foamed artificial stone is shown in FIG. 3. In FIG. 2, the artificial stone panel has been inverted so that the solid lower layer 10 faces upward so that the artificial stone pattern may be exposed. The cured foamed artificial stone was cut to a size of 30 cm×50 cm×13 mm. The weight of the cut foamed artificial stone was 1,810 g.

Comparative Example 1

A liquid acrylic resin was prepared containing 30 parts by weight of PMMA and 70 parts by weight of MMA. Blended with the liquid acrylic resin were 100 parts by weight of an aluminum hydroxide, based on 100 parts by weight of the liquid acrylic resin, 60 parts by weight of stone chips, based on 100 parts by weight of the liquid acrylic resin, and 2 parts by weight of benzoyl peroxide, based on 100 parts by weight of the liquid acrylic resin, and the components were mixed to obtain a slurry. The fluidity of the slurry was 11.3 cm/min. The slurry was poured into a molding cell, and then cured to obtain a solid surface article. The solid surface article was cut to the same size as in Example 1, and the weight was 3,330 g. As the examples indicate, a foamed artificial stone article according to the present embodiments may reduce the weight by as much as about 50%, as compared to non-foamed artificial stone article.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A foamed stone article, comprising:
a layer of artificial stone; and
a foam layer, wherein:
the foam layer and the layer of artificial stone are a single body and both include an acrylic polymer,
the foamed stone article includes:
the acrylic polymer; and
about 10 to about 80 parts by weight of solid particles, based on 100 parts by weight of the acrylic polymer,
the solid particles have a specific gravity greater than that of the acrylic polymer, and
the foam layer is substantially free of blowing agent.

2. The foamed stone article as claimed in claim 1, wherein the acrylic polymer includes a polymer of at least one of acrylic acid, methyl acrylate, ethyl acrylate, butyl acrylate, methyl methacrylate, ethyl methacrylate, isopropyl methacrylate, butyl methacrylate, or 2-ethylhexyl methacrylate.

3. The foamed stone article as claimed in claim 1, wherein the solid particles include at least one of a first inorganic filler, stone chips, or a mixture thereof.

4. The foamed stone article as claimed in claim 3, wherein the solid particles include the first inorganic filler, and the first inorganic filler includes at least one of calcium carbonate, aluminum hydroxide, silica, alumina, magnesium hydroxide, zinc oxide, or a mixture thereof.

5. The foamed stone article as claimed in claim 3, wherein the solid particles include the stone chips, and the stone chips are a cured and pulverized mixture of a second acrylic resin, about 100 to about 200 parts by weight of a second inorganic filler, based on about 100 parts by weight of the second acrylic resin, about 0.1 to about 10 parts by weight of a cross-linking agent, based on about 100 parts by weight of the second acrylic resin, and about 0.1 to about 10 parts by weight of a second initiator based on about 100 parts by weight of the second acrylic resin.

6. The foamed stone article as claimed in claim 1, wherein the foam layer has irregular pores.

7. A method for preparing a foamed stone article, comprising:
mixing an acrylic resin, solid particles, and an initiator to form an acrylic resin mixture;
resting the acrylic resin mixture for a period of time sufficient to allow the acrylic resin to migrate to an upper part to form an upper layer while the solid particles migrate to a lower part to form a lower layer; and
curing the rested acrylic resin mixture while foaming the acrylic resin of the upper layer substantially without using a blowing agent, wherein:
the curing forms an acrylic polymer from the acrylic resin mixture,
the foamed stone article includes:
a lower layer of artificial stone; and
an upper foam layer, wherein the upper foam layer and the lower layer of artificial stone are a single body and both include the acrylic polymer, and
the foamed stone article includes:
the acrylic polymer; and
about 10 to about 80 parts by weight of the solid particles, based on 100 parts by weight of the acrylic polymer,
the solid particles have a specific gravity greater than that of the acrylic resin, and
the upper foam layer is substantially free of blowing agent.

8. The method as claimed in claim 7, wherein exothermic polymerization during the curing produces the foaming.

9. The method as claimed in claim 7, wherein the solid particles include at least one of inorganic filler, stone chips, or a mixture thereof.

10. The method as claimed in claim 7, wherein the mixture has a fluidity ranging from about 13 cm/min to about 20 cm/min.

11. The method as claimed in claim 7, wherein the acrylic resin includes a mixture of at least one acrylic monomer and polyacrylate.

12. The method as claimed in claim 7, further comprising pouring the acrylic resin mixture onto a surface of a solid artificial stone plate before resting the acrylic resin mixture for the period of time sufficient to allow the acrylic resin to migrate to the upper part.

* * * * *